United States Patent [19]

Harron

[11] Patent Number: 5,764,136
[45] Date of Patent: Jun. 9, 1998

[54] ULTRASONIC DETECTION SYSTEM FOR SAFETY OF VEHICLE PASSENGERS

[75] Inventor: Brian Harron, Kinburn, Canada

[73] Assignee: Her Majesty the Queen in Right of Canada as represented by Communications Research Centre, Ottawa, Canada

[21] Appl. No.: 880,398

[22] Filed: Jun. 23, 1997

Related U.S. Application Data

[63] Continuation of Ser. No. 622,784, Mar. 27, 1996, abandoned.

[51] Int. Cl.$^6$ ............................................. B60Q 1/00
[52] U.S. Cl. ............................ 340/435; 340/436; 340/904
[58] Field of Search ...................................... 340/435, 433, 340/436, 904; 367/909, 140, 112

[56] References Cited

U.S. PATENT DOCUMENTS

| | | | |
|---|---|---|---|
| 4,382,291 | 5/1983 | Nakauchi | 367/93 |
| 4,442,512 | 4/1984 | Kodera et al. | 367/87 |
| 4,551,722 | 11/1985 | Tsuda et al. | 340/904 |
| 4,658,385 | 4/1987 | Tsuji | 340/904 |
| 4,800,540 | 1/1989 | Annala | 367/87 |
| 4,937,795 | 6/1990 | Motegi et al. | 367/93 |
| 5,076,384 | 12/1991 | Wada et al. | 180/169 |
| 5,170,858 | 12/1992 | Chen | 180/169 |
| 5,210,521 | 5/1993 | Hojell et al. | 340/436 |
| 5,235,315 | 8/1993 | Cherry et al. | 340/435 |
| 5,250,945 | 10/1993 | Dombrowski | 340/904 |
| 5,341,344 | 8/1994 | O'Brien et al. | 340/904 |

FOREIGN PATENT DOCUMENTS

| | | |
|---|---|---|
| 734618 | 5/1966 | Canada. |
| 797417 | 10/1968 | Canada. |
| 838307 | 3/1970 | Canada. |
| 2029089 | 5/1991 | Canada. |
| 2060791 | 8/1992 | Canada. |
| 1325841 | 1/1994 | Canada. |

Primary Examiner—Jeffery A. Hofsass
Assistant Examiner—John Tweel, Jr.
Attorney, Agent, or Firm—Neil Teitelbaum & Associates

[57] ABSTRACT

This invention relates to a new and useful system and method of ultrasonic detection for use on in the monitoring of the danger zone of a vehicle. The system comprises at least one sensor, an analog and digital integrated circuit, a power driver and a microprocessor. The microprocessor is programmed to control the sensors, to receive a plurality of signals from the sensors, establish and store an initial reference image, monitor a second plurality of signals received from a continuous scan of the sensors, establish a data set for the second plurality of signals, compare the data set with the initial reference image and return an alarm output if a variation is detected.

16 Claims, 9 Drawing Sheets

ULTRASONIC DETECTION SYSTEM FOR SAFETY OF VEHICLE PASSENGERS

This application is a Continuation of application Ser. No. 08/622,784, filed on Mar. 27, 1996, now abandoned.

FIELD OF THE INVENTION

This invention relates to an ultrasonic detection system for safety of vehicle passengers.

BACKGROUND OF THE INVENTION

A child is prone to be hit accidentally by a school bus moving forward when the child remains in front of the bus, but out of sight of the driver. Mechanical barrier devices such as swing-out plastic barriers have been used to prevent children from going in front of a school bus but these are cumbersome and require constant maintenance. The area of coverage is limited by the physical mounting and sweep area of the mechanical device. The swing-out arm serves only as a visual guide to defining a danger zone and does not detect the presence of an object or person. Safety protection is therefore minimal.

Radar and Doppler radar systems are very expensive and need regular maintenance and calibration. These systems suffer from errors caused by air flow disturbances and moving objects. Self-calibration to adapt the system to a changing surveillance area is not feasible with radar systems.

Infrared detectors are prone to errors caused by temperature fluctuations. Reflections from nearby objects or reflective surfaces reduce the sensitivity of the infrared sensors. The viewing angle of these systems is limited and not suited for school bus applications unless complicated mechanical shuttering devices or optical lens methods are employed.

Single sensors or single target ultrasonic burglar-alarm-type detectors are not readily adaptable for use on school buses. The alarm is instantaneous and cannot be reset. Self-calibration is complicated requiring a detection time constant and smoothing techniques such as the use of median and standard deviation. Ultrasonic burglar alarm intrusion systems do not adapt themselves readily to outdoor use due to the use of delicate foil transducers.

Existing ultrasonic detection systems employ complex hardware circuitry which is used to adjust sensitivity for alarm activation. Complex analogue-to-digital converters and variable-gain threshold amplifiers are required to set the sensors working range. A mean and/or a standard deviation calculation is used by some systems to set the detection and/or triggering threshold.

The problem is therefore to design a reliable, accurate, simple and economical method of detection of a person(s) or object(s) within the danger zone of a vehicle, such as a school bus, before it starts to move. What is needed to assist the bus driver in the prevention of accidents is a self-calibrating system that can be reset to allow for surveillance of changing areas while operating in a wide range of environmental conditions. The ultrasonic transducers (sensors) need to be low-power, small and light weight, highly reliable and rugged and have a low ultrasonic operating frequency to minimise signal attenuation in air. A wide beam width is very desirable to cover a larger area with fewer sensors.

SUMMARY OF THE INVENTION

It is an object of this invention to provide a reliable ultrasonic monitoring system for detecting the presence of a person(s) and/or object(s) in the danger zone of a vehicle.

In one aspect of the invention there is provided for use in the monitoring of a danger zone of a vehicle, an ultrasonic system comprising one or more sensors, circuit means for enhancing the selectivity and sensitivity of detecting sound waves from the sensor(s) and a microprocessor. The microprocessor receives a plurality of signals from the sensor(s), establishes and stores an initial reference image, monitors a second plurality of signals received from a continuous scan of the sensor(s), establishes a data set for the second plurality of signals, compares the data set with the initial reference image and returns an alarm output if a variation between the initial reference image and the data set is detected.

In another aspect of the invention there is provided a method for the ultrasonic monitoring of a danger zone of a vehicle using a system comprised of one or more sensors, circuit means for enhancing the selectivity and sensitivity of detecting sound waves from the sensor(s) and a microprocessor programmed to control the sensors. The method comprises the steps of:

initiating an area scan to obtain an initial digital reference image of the danger zone, storing the reference image;

continuously scanning the danger zone;

establishing and continuously updating a corresponding weighted arithmetic alarm probability data set;

comparing the data set with the reference image; and setting an alarm condition if significant variations between the data set and the reference image are detected.

BRIEF DESCRIPTION OF THE DRAWINGS

These and other advantages of the invention will become apparent upon reading the following detailed description and upon referring to the drawings in which.

Figure 1:
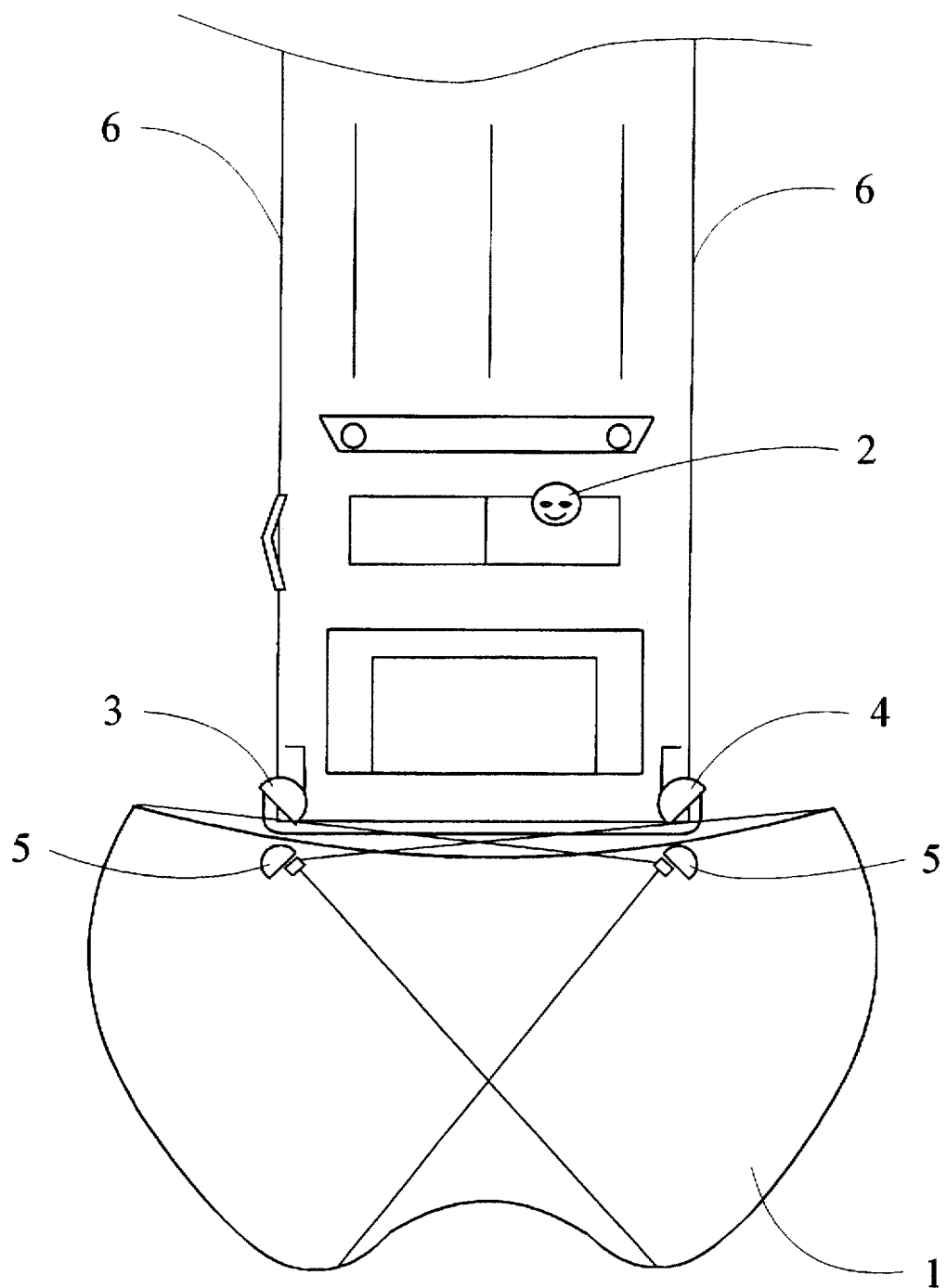
FIG. 1 illustrates the top view of a school bus, the areas of greatest danger to passengers, and the location of sensor components within a preferred embodiment.

A While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

Turning to the drawings, with reference to FIG. 1, the area 1 of greatest danger to passengers as they load or unload from a bus are directly in front of the vehicle. The bus driver 2 has no direct line-of-sight of area 1 except indirectly via mirrors 3 which are normally distorted due to mirror type (typically spherical). Within area 1 the bus driver 2 cannot directly see a small person. Clothing color, lighting, and weather conditions combined with curved mirrors impair the bus driver's 2 view of area 1 where a passenger might have stopped moving.

The present invention preferably includes two ultrasonic transducers (transmitter/receivers) 5 mounted on the vehicle's front bumper 4. These transducers 5 are adjusted so that they provide a coverage area 1 within which all objects will reflect an ultrasonic acoustic echo when pulsed with ultrasonic transmitted energy. The two transducers 5 overlap in their area of coverage 1 to provide signal redundancy and fault detection.

The ultrasonic transducers 5 are of a hard-cased solid-state piezoelectric type that can withstand severe vibration and elemental conditions without degradation. The useful solid angle of dispersion and reception is typically in the range of 60 to 100 degrees conical. A lower-frequency (40 kHz) piezo-electric ultrasonic transducer 5 is used to minimize signal losses due to sound absorption in air which increases with operating frequency. This increases the reliability in signal reception even in inclement weather. Precision aiming of the transducers 5 is not necessary since overlap and sensitivity is relatively wide ranging.

Figure 2:
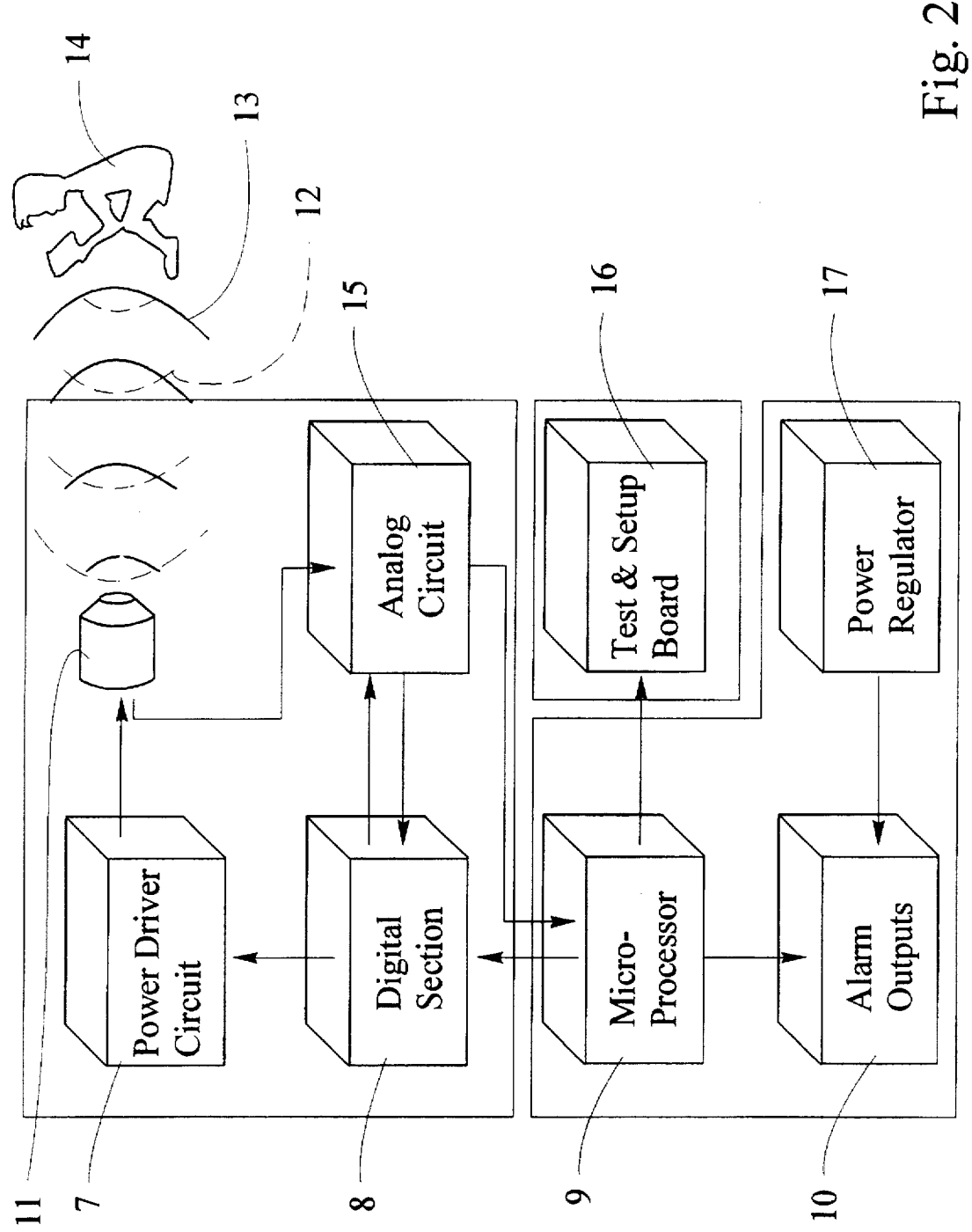
FIG. 2 is a block diagram of the complete system and various individual modules that are interconnected and controlled by a microprocessor.
Figure 3:
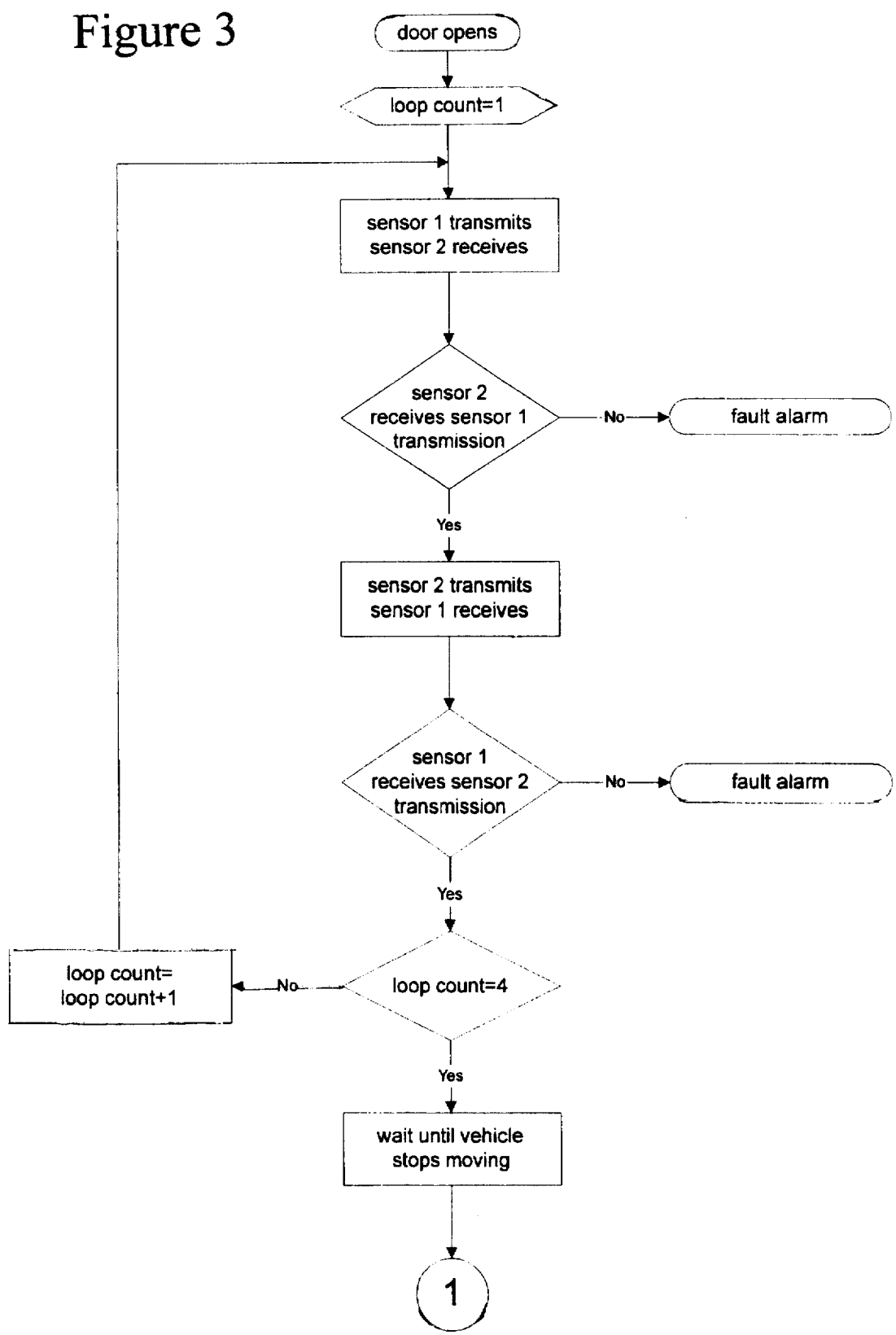
FIGS. 3–9 are flowcharts depicting the sequence of events implemented by a microsequencer.
Figure 4:
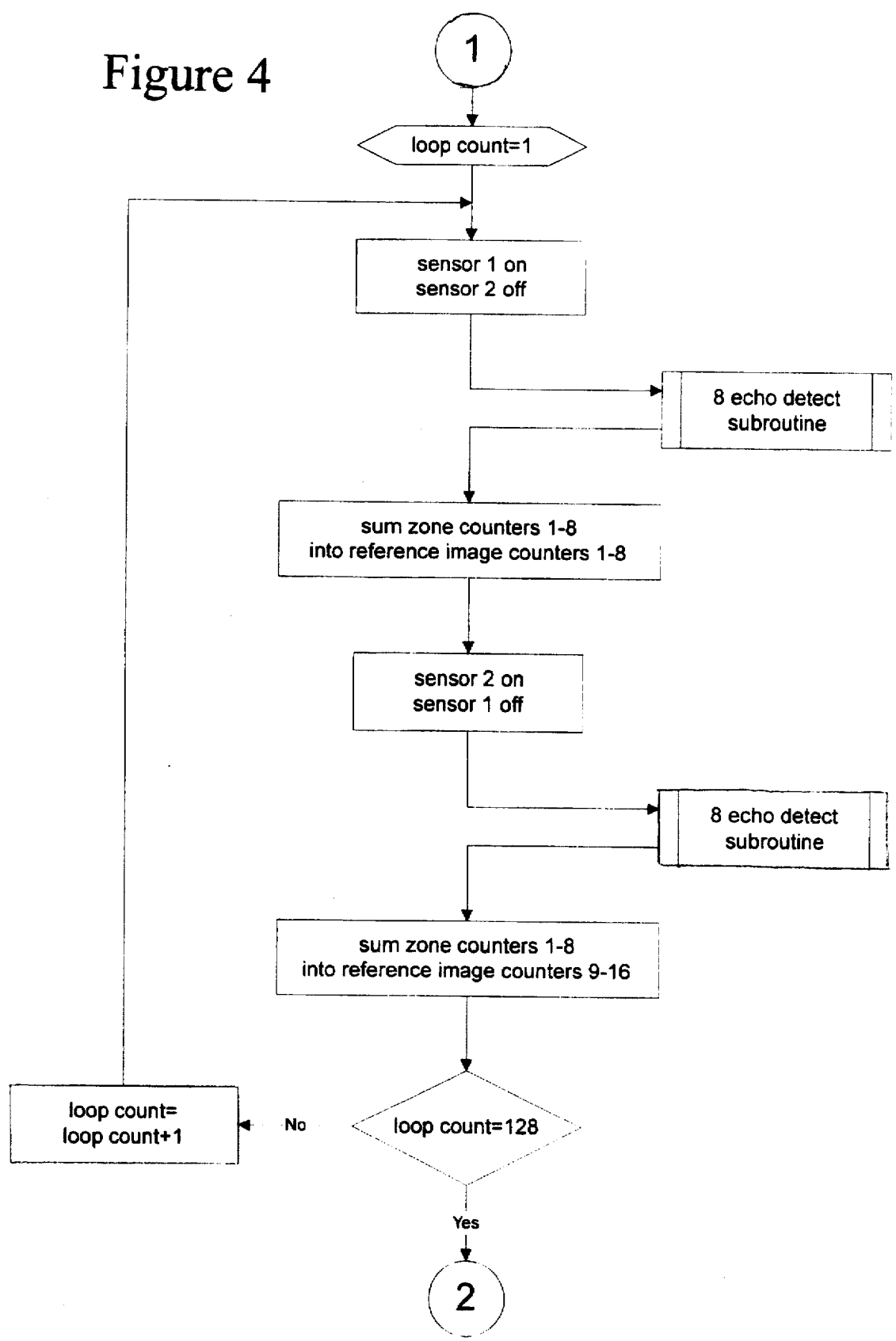
Figure 5:
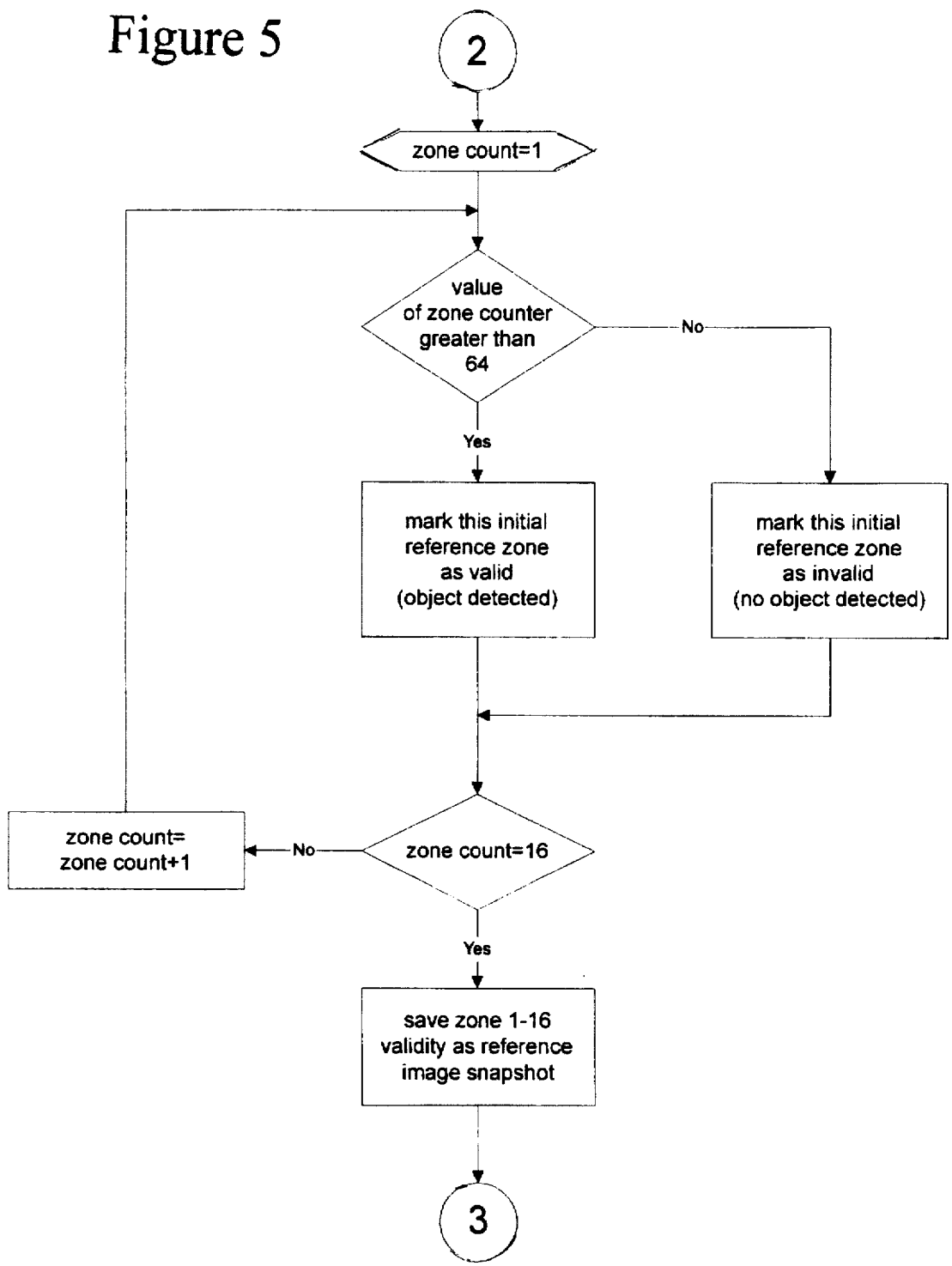
Figure 6:
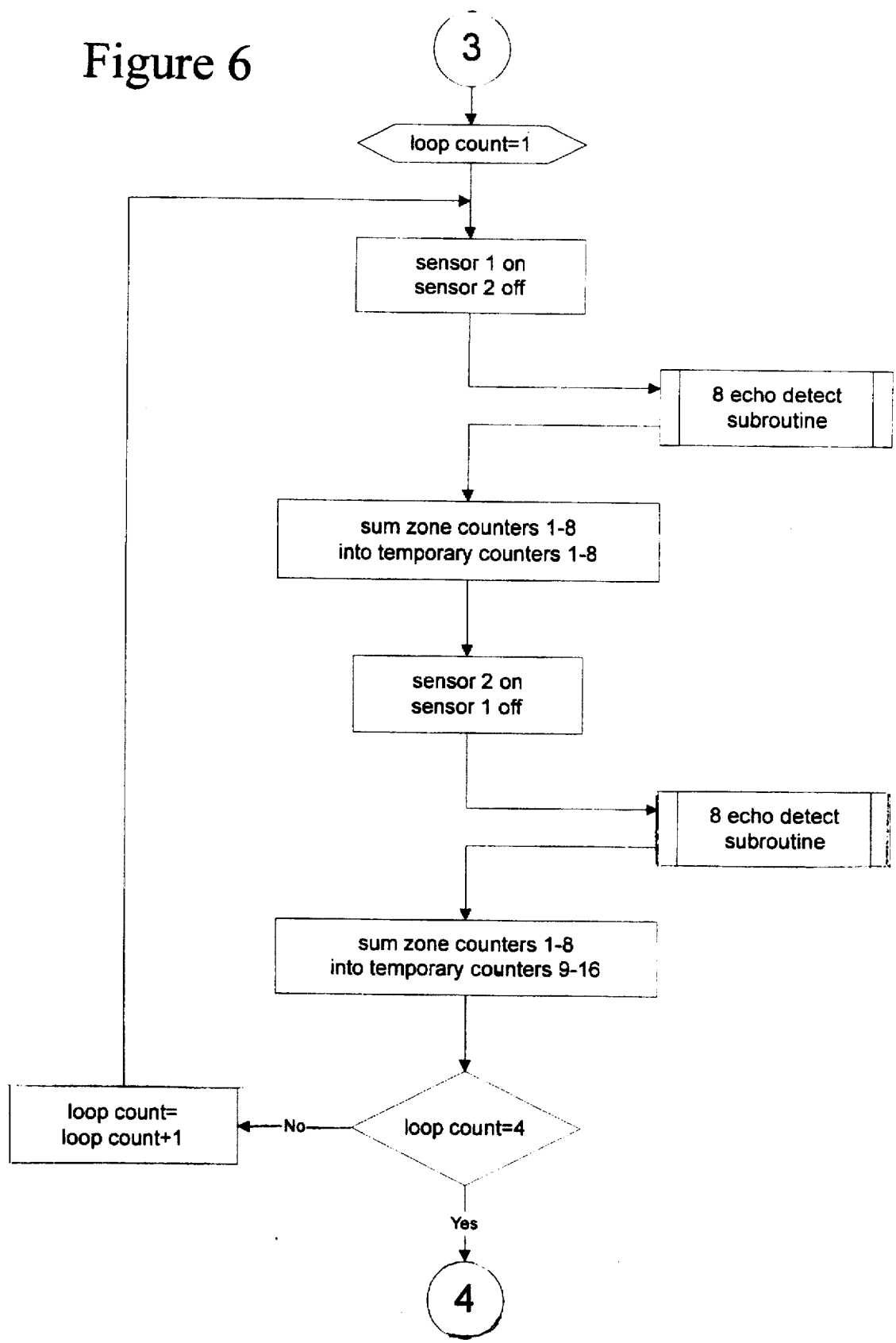
Figure 7:
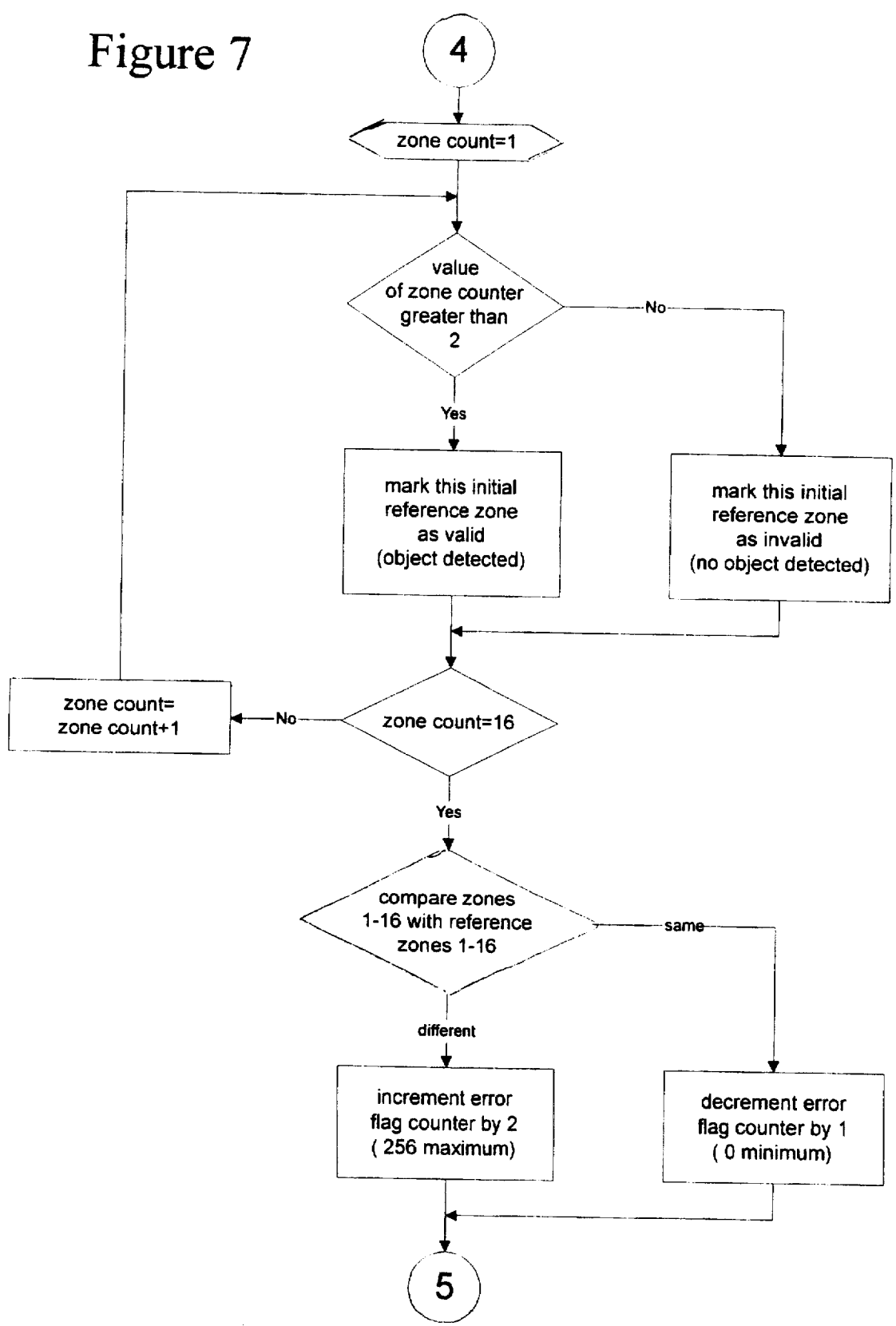
Figure 8:
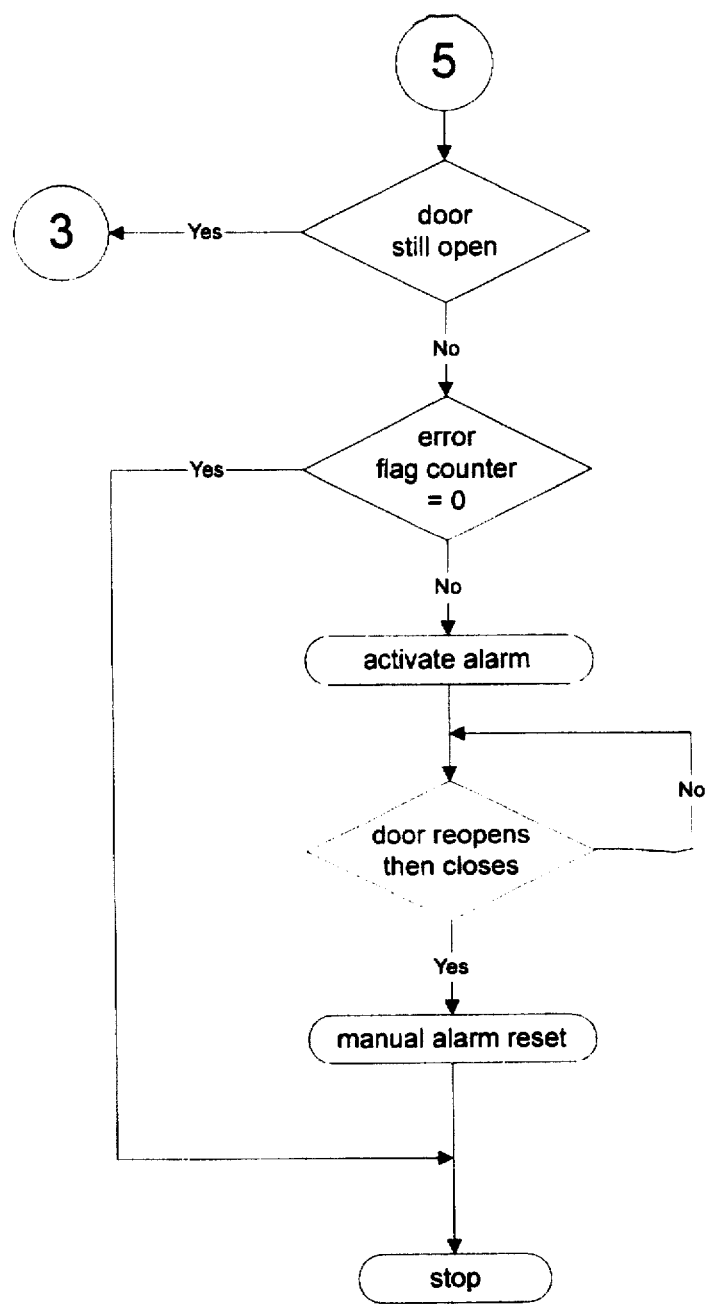
Figure 9:
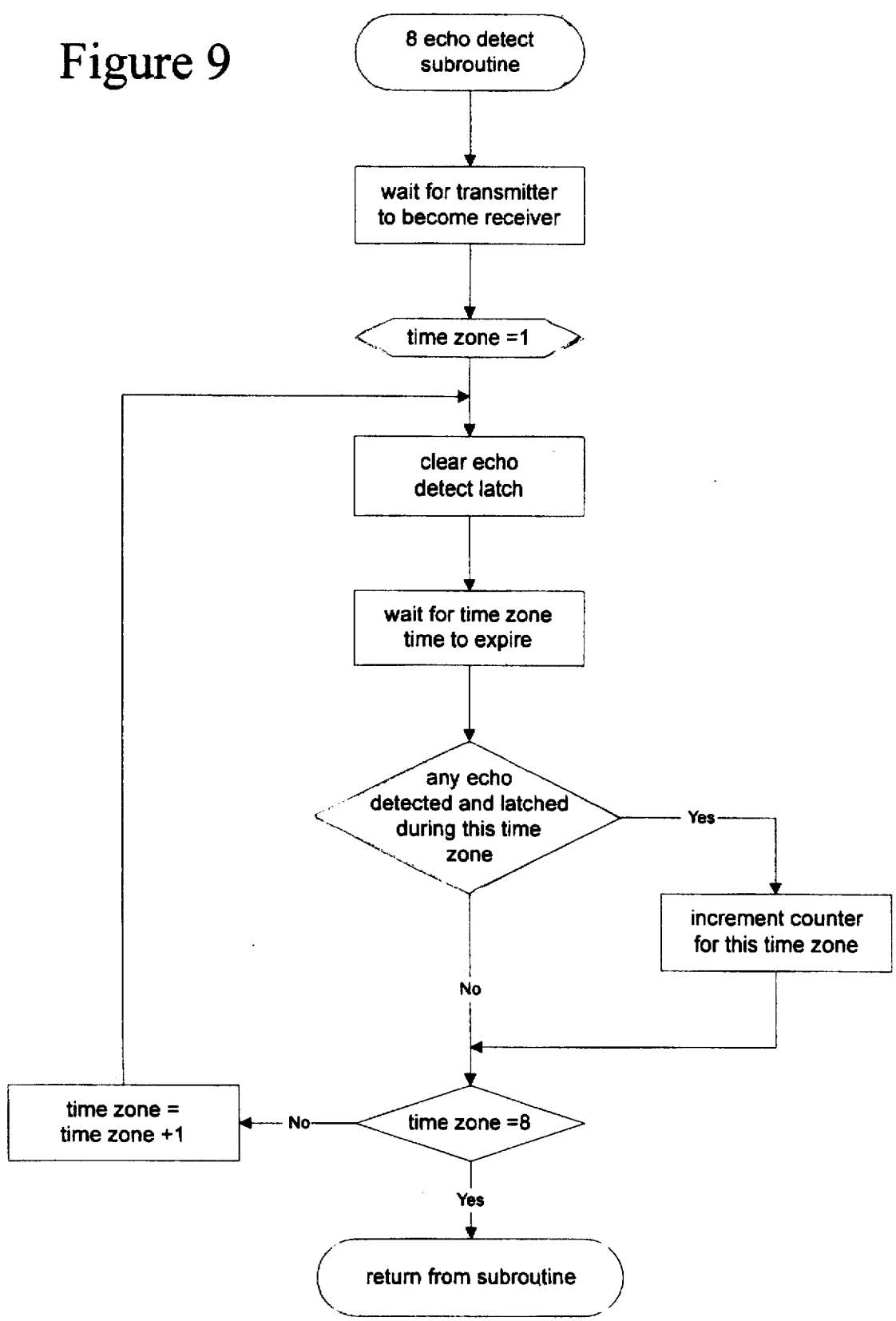

Generally the operation of the present invention is shown in the block diagram of FIG. 2. When instructed by a micro-controller 9, one transducer 11 controlled by a digital counter 8 and a power driver 7 emits 16 cycles of 40 Kilohertz pulsed energy 13 toward the area to be scanned where objects 14 may happen to be present. The sound wave travels through the air and reflects off all objects in its path. Some of the reflected energy 12 is reflected back towards the transducer(s) 11 which now functions as receiver to gather and optimize echoes of the same frequency of signals previously transmitted.

Selecting a sensor with a large beam width, in the range of 60 to 100 degrees conical, enables the system to scan a larger danger zone using fewer sensors. Echo reflections directly from the object, as well as echo reflections via the road surface or other object, enhance the reliability of detection by creating redundancy. Multiple object reflections are particularly useful when scanning an area with complex paths such as under the carriage of a school bus where tires and metal members become obstacles.

The electrical signals generated by the echoes are routed to analog filter circuitry 15 which enhances the selectivity and sensitivity of detecting the reflected sound waves. The same cycle is repeated for the other transducer(s) 11 and the alternating process continues until instructed to stop. Alarm outputs 10 are triggered if the specific detection parameters are met. Calibration and set-up are facilitated by the connection of a test-and-set-up circuit board 16 which gives a visual indication of echo detection and sensitivity.

Additional transducers can be placed at other locations on the vehicle, such as in front of the tires or under the carriage, (not shown) to expand the area of coverage as necessary. These additional transducers are time slotted into the sequence of scanning such that any number of sensors generate reflected pulse information sequentially.

The functional description for the software as implemented in this embodiment can be summarized as follows:

```
door opens
   loop 4 times
      sensor 1 transmits
      sensor 2 listens
      fault if not detected
      sensor 2 transmits
      sensor 1 listens
      fault if not detected
```

-continued

```
repeat 4 loop
delay 1.3 sec (bus stopping and surroundings stabilising)
   loop 128 times
            sensor 1 on sensor 2 off
            subroutine 8 echo detect
            save zone 1-8 info reference autoincrement
            sensor 2 on sensor 1 off
            subroutine 8 echo detect
            save zone 9-16 info reference autoincrement
   repeat 128 loop
slice zones 1-16 reference @ 64/128 (50% hits mean valid object)
save as reference snapshot in memory
start of live scans
   loop 4 times
            sensor 1 on sensor 2 off
            subroutine 8 echo detect
            save zone 1-8 info temporary autoincrement
            sensor 2 on sensor 1 off
            subroutine 8 echo detect
            save zone 9-16 info temporary autoincrement
   repeat 4 loop
   slice zones 1-16 temporary @ 2/4 (50% hits mean valid object)
   compare zones 1-16 with reference zones 1-16
   any difference in any zone causes +2 error flag count
   if not different then -1 error flag count
   loop to start of live scans if door still open
   door closes
            if error flag not zero then alarm output
   wait for driver to manually reset system
   clear alarm and wait for door to close
loop to door open (wait for next bus stop)
subroutine 8 echo detect
   wait 3 msec for transmit pulse decay
   loop for 8 distance zones
            send timed blanking pulse to clear echo detect latch
            wait 1.5 sec and check echo latch
            increment zone value if echo detected
   repeat 8 loop
return from subroutine 8 echo detect
```

The summarized software description heretofore described may be more readily understood by those with a limited programming skills after reviewing FIGS. 3 to 8 which illustrate the software description by use of flow-charts.

The software can be programmed into an 8-bit microprocessor which controls the transducer sequencing and timing. Storage of temporary and reference images can be accomplished by RAM memory. Threshold and slicing algorithms can be changed to suit environmental conditions.

At each vehicle stop, an area scan is initiated to obtain a digital reference image to include all objects and topographical features of the area presently within the scanner range. The surveillance area is then continuously scanned and a weighted arithmetic alarm probability data set is updated in the microprocessor storage memory. Just before the vehicle moves, a comparison is made between the current accumulated alarm probability data and the stored initial reference image. An alarm condition will be set if significant variations are detected.

Numerical analysis techniques are used to eliminate unwanted spurious signals such as an object passing through the area of surveillance. Majority logic detection algorithms are used to improve reliability of the system. Initialisation occurs each time the vehicle stops and the passenger door is opened, thus a self-calibrating initial reference area scan can accommodate varying conditions and background reflections that occur such as seasonal road surface variations. A self-test operation is also performed at each door opening to ensure that all transducers are functional in both transmit and receive modes of operation.

Thus, it is apparent that there has been provided in accordance with the invention a system and process for use in the ultrasonic detection of persons or objects within the danger zone of a vehicle that fully satisfies the objects, aims and advantages set forth above. While the invention has been described in conjunction with illustrated embodiments thereof, it is evident that many alternatives, modifications and variations will be apparent to those skilled in the art in light of the foregoing description. Accordingly, it is intended to embrace all such alternatives, modifications and variations as falling within the spirit and broad scope of the invention.

What I claim as my invention:

1. An ultrasonic system for use in monitoring a danger zone of a vehicle, said system comprising:

one or more transducers;

circuit means for analog to digital signal conversion of acoustic echoes of signals from said transducers and to provide digital information corresponding to said acoustic echoes; and a processor programmed for controlling said transducers, said processor programmed to, upon receiving said digital information corresponding to a sequence of digitized acoustic echoes from said circuit means for analog to digital conversion;

a) generate from said information, an initial reference data set representing a pattern of distances, the pattern of distances corresponding to echoes received as reflections from objects at plurality of locations in the danger zone from said one or more transducers;

b) establish and store said initial reference data set representing objects detected in said danger zone when said vehicle becomes stationary, c) monitor a subsequent sequence of digitized acoustic echoes received from said transducers, d) generate from said subsequent sequence of digitized acoustic echoes a second data set representing a pattern of distances, the pattern of distances corresponding to echoes receieved as reflections from objects at plurality of locations from said one or more transducers;

e) compare said second data set with said initial reference data set and, f) return an alarm output if a variation greater than a predetermined value between said initial reference data set and said second data set is detected.

2. The system of claim 1 wherein said one ore more transducers operate at a beam width in the range of 60 degrees to 100 degrees conical.

3. The system of claim 1, including two transducers arranged to overlap their respective areas of coverage to provide signal redundancy, a broad coverage area and fault detection.

4. The system according to claim 1 including a test and set-up board for calibration and set-up of the system.

5. The system according to claim 1 including power means to operate the system.

6. An ultrasonic system for use in the monitoring of a danger zone of a vehicle when stationary, to detect persons or objects within said danger zone, said system comprising:

two ultrasonic transducers operating at a beam width in the range of 60 degrees to 100 degrees conical, said transducers arranged on said vehicle to overlap in their respective areas of coverage to provide signal redundancy and fault detection;

circuit means for analog to digital signal conversion of acoustic echoes of signals from said transducers;

power means to operate the system;

a test and set-up board for calibration and set-up of the system; and a microsequencer programmed for controlling said transducers, said microsequencer is programmed to, upon receiving a sequence of digitized acoustic echoes from said transducers:

a) generate from said digitized acoustic echoes an initial reference data set representing a a pattern of distances, (b) establish and store said initial reference data set defining objects in said danger zone when the vehicle is stationary, (c) monitor a subsequent sequence of digitized acoustic echoes of signals from said transducers, (d) generate from said subsequent sequence of digitized acoustic echoes a second data set representing a pattern of distances, (e) establish said second data set and compare said second data set with said initial reference data set and, (f) return an alarm output if a variation greater than a predetermined value between said initial reference data set and said second data set is detected.

7. A method of ultrasonic monitoring of a danger zone of a vehicle when stationary, using a system comprised of one or more transducers, circuit means for analog to digital conversion and a microsequencer programmed to control said transducers, said method comprising the steps of:

initiating an area scan to obtain and generate an initial digital reference data set representing a pattern of distances of objects present in said zone when said vehicle is stationary, by a) sending a first signal from said microsequencer to said transducer, said transducer in response to said signal emitting a first burst of pulsed energy towards said danger zone;

b) after a first predetermined time $t_1$, receiving echoes reflected from an object in a path of travel of said pulsed energy;

c) said transducers generating corresponding electrical signals;

d) routing said signals to said circuit for analog to digital conversion;

e) after a second predetermined time $t_2$, receiving echoes reflected from a different object in a path of travel of said pulsed energy;

f) said transducers generating corresponding electrical signals; and, g) routing said signals to said circuit for analog to digital conversion;

storing said reference data set;

scanning said danger zone;

establishing and updating a corresponding second data set;

comparing said second data set with said reference data set before said vehicle moves; and setting an alarm condition in dependence upon significant variations above a predetermined level between said second data set and said initial reference data set being detected.

8. The method of claim 6 including provision of an initialization process each time a door of said vehicle is opened, said initialization process comprising the steps of:

performing a self-test operation on said system to ensure said transducers are functional;

clearing said stored initial reference data set; and initiating said method.

9. The method of claim 6 wherein said initial reference data set is obtained by the steps of:

sending a signal from said microsequencer to said transducer;

said transducer emitting a plurality of cycles of pulsed energy towards said danger zone;

said transducers receiving echoes reflected from objects in a path of travel of said pulsed energy;

said transducers generating corresponding electrical signals; and routing said signals to said circuit for analog to digital conversion.

10. The method of claim 6 wherein said second data set is obtained by the steps of:

sending a signal from said microsequencer to said transducer;

said transducer emitting 16 cycles of pulsed energy towards said danger zone;

said transducers receiving echoes reflected from objects in a path of travel of said pulsed energy;

said transducers generating corresponding electrical signals;

routing said signals to said circuit for analog and digital conversion; and repeating the steps until a stop signal is received.

11. The method of claim 6 wherein said comparing comprises the steps of:

establishing and updating said corresponding second data set as a weighted arithmetic alarm probability data set;

storing said weighted arithmetic probability data set;

using statistical analysis algorithms to enable said microsequencer to analyze and apportion a suitable increment or decrement rate to a set of temporary storage alarm probability registers before alarm activation;

comparing current accumulated alarm probability data with said reference image and;

setting an alarm condition if significant variations are detected.

12. The system according to claim 1 wherein said transducer comprises a piezoelectric ultrasonic transducer.

13. An ultrasonic system for monitoring a danger zone of a vehicle, said system comprising:

transducer means for generating ultrasonic acoustic energy and for receiving reflected echoes;

circuit means for analog to digital signal conversion of acoustic echoes from said transducer means; and a microsequencer programmed for controlling said transducer means, said microsequencer is programmed to, upon receiving a sequence of digitized acoustic echoes from said circuit means:

a) generate from said sequence of digitized acoustic echoes an initial reference data set relating to objects in said danger zone at the time said vehicle becomes stationary, wherein the initial data set is derived from signals reflected from a plurality objects at different distances from said transducer means;

(b) store said initial data set;

(c) generate a subsequent sequence of acoustic signals;

(d) monitor a subsequent sequence of digitized acoustic echoes of the acoustic signal;

(e) generate from said subsequent sequence of digitized acoustic echoes, a second data set wherein the second data set is derived from objects at a plurality of different locations, and, (f) compare said second data set with said initial reference data set and, (g) signal an alarm if a variation between said initial reference data set and said second data set is greater than a predetermined value.

14. An ultrasonic system for use in the monitoring of a danger zone of a vehicle, as defined in claim 1, wherein the generation of the initial reference data set representing a pattern of distances includes the steps of:

a) sending a first signal from said microsequencer to said transducer, said transducer in response to said first signal emitting a first burst of pulsed energy towards said danger zone;

b) after a first predetermined time $t_1$, receiving echoes reflected from an object in a path of travel of said pulsed energy;

c) said transducers generating corresponding electrical signals;

d) routing said signals to said circuit means for analog to digital conversion;

e) after a second predetermined time $t_2$, receiving echoes reflected from a different object in a path of travel of said pulsed energy;

f) said transducers generating corresponding electrical signals; and, g) routing said signals to said circuit for analog to digital conversion.

15. A method of ultrasonic monitoring of a danger zone of a vehicle when stationary, using a system comprised of one or more transducers, circuit means for analog to digital conversion and a microsequencer programmed to control said transducers, said method comprising the steps of:

initiating an area scan to obtain and generate an initial digital reference data set representing a pattern of distances of objects present in said zone when said vehicle is stationary, said initatiating step including the steps of:

a) providing a plurality of times $t_n$, where n is an integer;

b) sending a first signal from said microsequencer to said transducer, said transducer in response to said signal emitting a first burst of pulsed energy towards said danger zone;

c) after a first predetermined time $t_1$, receiving echoes reflected from an object in a path of travel of said pulsed energy;

d) said transducers generating corresponding electrical signals;

e) routing said signals to said circuit for analog to digital conversion;

f) after an predetermined time $t_n$, receiving echoes reflected from a different object in a path of travel of said pulsed energy, g) said transducers generating corresponding electrical signals;

h) routing said signals to said circuit for analog to digital conversion;

i) performing the steps of (e) to (g) for different values of n a predetermined number of times, each corresponding to a different value of n;

storing said reference data set:

scanning said danger zone;

establishing and updating a corresponding second data set;

comparing said second data set with said reference data set before said vehicle moves; and setting an alarm condition in dependence upon significant variations above a predetermined level between said second data set and said initial reference data set being detected.

16. A method as defined in claim 15, where n is a value from 2 to 8.

* * * * *